Figure 1:
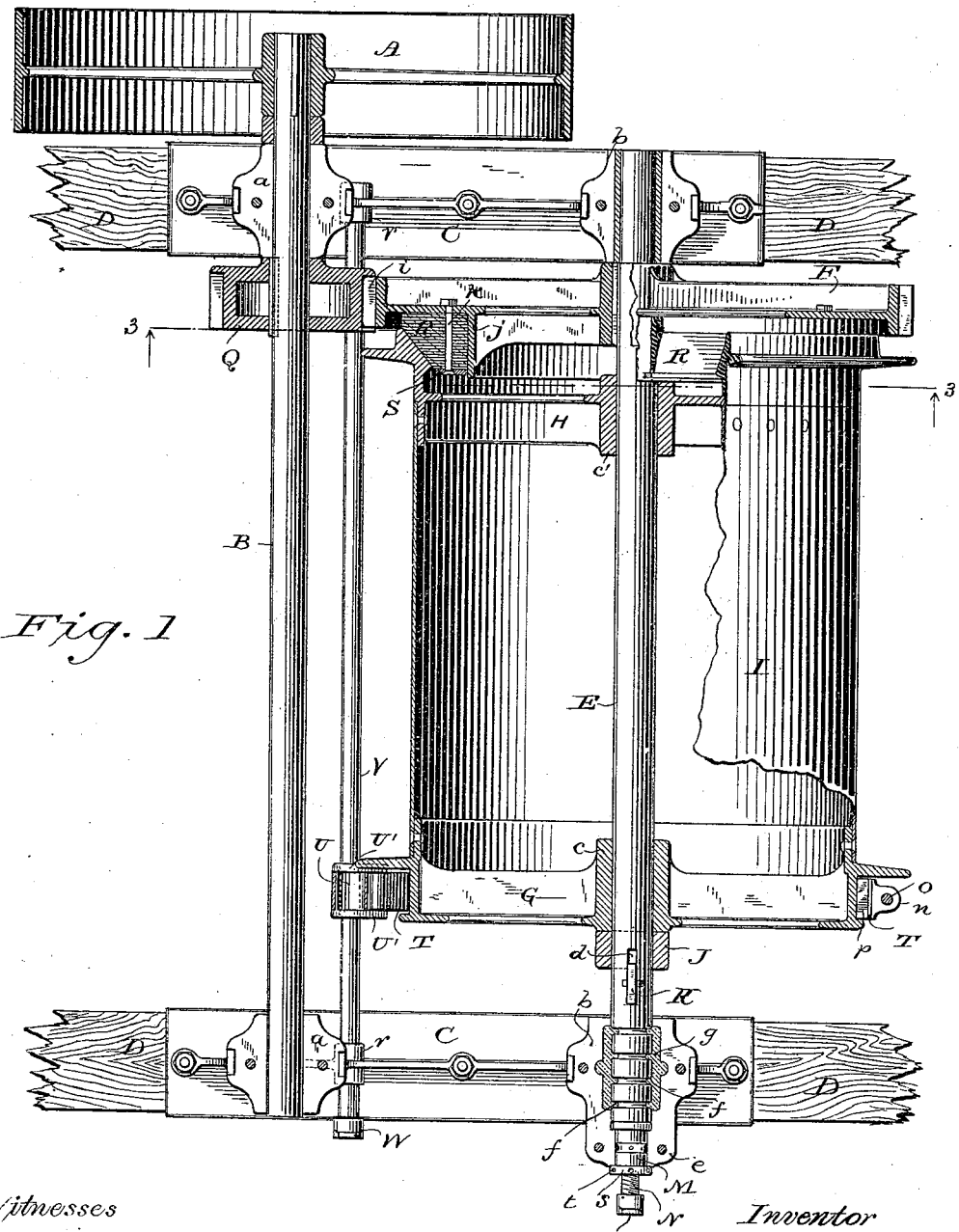

(No Model.) 2 Sheets—Sheet 1.

H. B. TEFFT.
HOISTING MACHINE.

No. 428,430. Patented May 20, 1890.

Witnesses
Geo. W. Young,
N. E. Oliphant

Inventor
Henry B. Tefft
By Stout & Underwood
Attorneys (No Model.) 2 Sheets—Sheet 2.
H. B. TEFFT.
HOISTING MACHINE.
No. 428,430. Patented May 20, 1890.
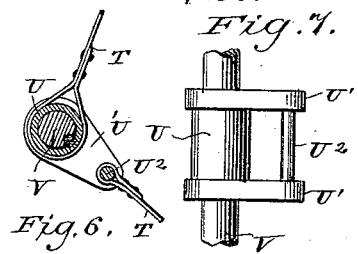
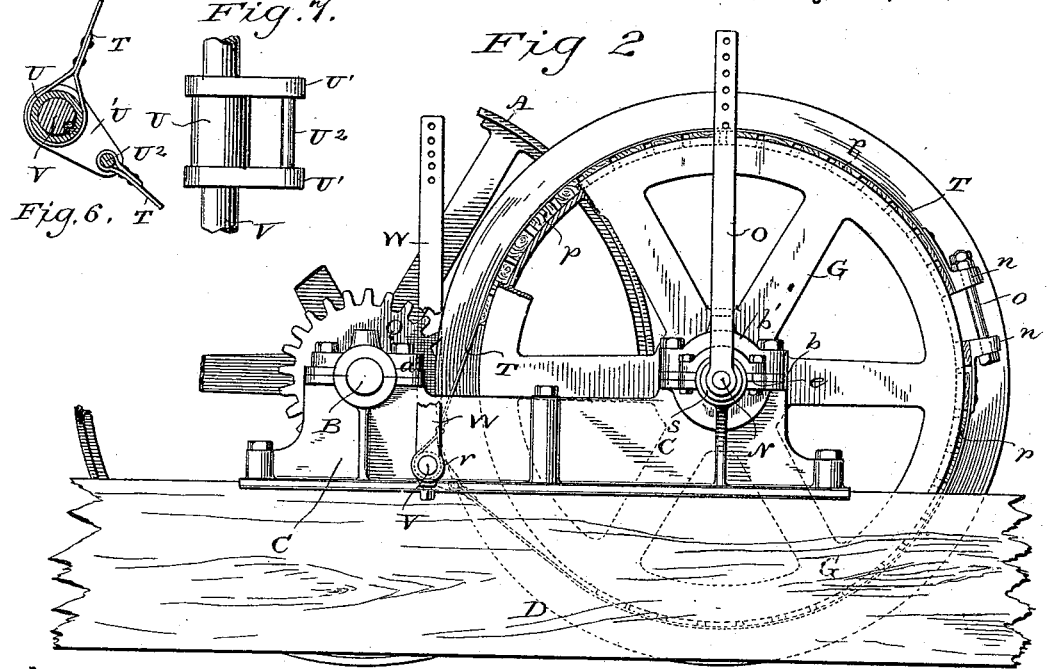
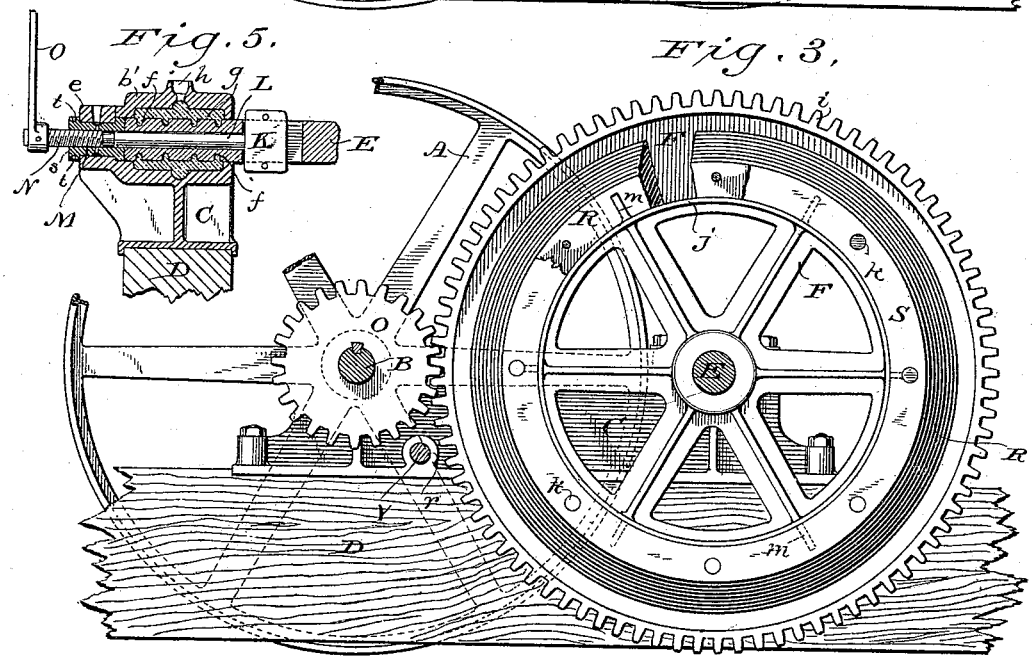
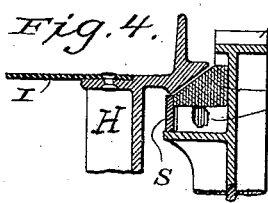
Witnesses
Geo. W. Young.
N. E. Oliphant.
Inventor
Henry B. Tefft
By Stout & Underwood
Attorneys
THE NORRIS PETERS CO., PHOTO-LITHO., WASHINGTON, D. C.

UNITED STATES PATENT OFFICE.

HENRY B. TEFFT, OF MILWAUKEE, WISCONSIN, ASSIGNOR OF ONE-HALF, BY MESNE ASSIGNMENTS, TO THE MOORE MANUFACTURING AND FOUNDRY COMPANY, OF SAME PLACE.

HOISTING-MACHINE.

SPECIFICATION forming part of Letters Patent No. 428,430, dated May 20, 1890.

Application filed November 17, 1887. Serial No. 255,377. (No model.)

*To all whom it may concern:*

Be it known that I, HENRY B. TEFFT, of Milwaukee, in the county of Milwaukee and in the State of Wisconsin, have invented certain new and useful Improvements in Hoisting-Machines; and I do hereby declare that the following is a full, clear, and exact description thereof.

My invention relates to hoisting-machines; and it consists in certain peculiarities of construction and combination of parts, to be hereinafter described with reference to the accompanying drawings, and subsequently claimed.

In the drawings, Figure 1 represents a plan view of my invention, some of the parts being broken away for the purpose of better illustration; Fig. 2, an end elevation; Fig. 3, a section taken on line 3 3, looking in the direction of the arrows, the winding-drum being removed; Figs. 4 and 5, detail sectional views, and Figs. 6 and 7 detail views of the brake mechanism.

Referring by letter to the drawings, A represents a driving-pulley fast on a main shaft B, the latter having its bearings $a$ on castings C, bolted or otherwise secured to sills D. The castings C are also provided with bearings $b$, for a shaft E, that has keyed thereto a friction-wheel F, and loose on this shaft are the hubs $c$ $c'$ of flanged rings G H, these rings being connected by a shell I to form a winding-drum.

Arranged on the shaft E, adjacent to the hub $c$ of the rear ring G, is a loose collar J, and said shaft is provided with a slot $d$ for a sliding key K, designed to be brought against the loose collar. The rear end of the shaft E is made hollow to receive a sliding pin L, that bears against the key K, and arranged in an extension $e$ of the rear bearing for said shaft is a flanged sleeve M, for a screw N, that normally impinges against the sliding pin and is actuated by a lever O, said sliding pin being of such length as to extend into the sleeve, as shown in Fig. 5.

In order to prevent horizontal displacement of the shaft E, I provide its rear end with a series of annular grooves $f$, and chamber its rear bearing to receive a boxing $g$ of Babbitt metal that fills up said grooves, as best illustrated by Figs. 1 and 5, the metal being run through a port $h$ in the cap-plate $b'$ of said bearing.

As shown, the wheel F, keyed to the shaft E, is provided upon its periphery with gear-teeth $i$, that mesh with a pinion Q on the main shaft B. The wheel F is preferably provided with an inwardly-projecting annular flange $j$, on which is arranged a series of paper rings successively laid one upon the other in a plane parallel to the axis of said wheel to form a friction-disk R. The paper rings are held in place against the adjacent side of the wheel F by means of an annulus S and bolts $k$, that are passed through said parts.

In order to hold the paper rings against annular displacement, I provide the periphery of the flange $j$ of the wheel E with a series of webs $m$ arranged at suitable intervals, and notch said rings at corresponding intervals to fit over upon these webs, as best illustrated by full and dotted lines, Fig. 3. As shown, a certain number of the outermost rings gradually decrease in diameter to form a beveled edge on the friction-disk. The beveled outer periphery of the disk R is in opposition to the beveled inner periphery of the flanged ring H, that forms that part of the winding-drum, and when the latter is moved forward these beveled surfaces come in frictional contact and thus the motion of the wheel E is imparted to said drum. By having a certain number of the innermost paper rings plain upon their edges the wear of the flanged ring H upon the beveled ring is compensated for by said ring gradually coming upon said innermost rings and reducing their edges to a bevel in proportion to the wear.

Surrounding the ring G of the winding-drum is a metallic strap T, preferably made in sections, having ears $n$ and united by a bolt $o$ passed through said ears to serve as a take-up to compensate for wear. Upon the inner face of the strap T and arranged at suitable intervals apart are a series of blocks $p$, designed to be brought into frictional contact with the periphery of said drum-ring. One end of the strap T is looped around a sleeve U, keyed to a shaft V, that has its bearings $r$ on the castings C and is actuated by means of a lever W, said sleeve being cast in one piece with arms U' united at their outer ends by a pin $U^2$, around which is looped the other end of said strap, the construction just described being best illustrated by Figs. 6 and 7.

In the operation of my invention when the lever O is moved in one direction the screw N is actuated to impart a forward movement to the sliding pin L, and the key K is thus brought tight against the loose collar J to communicate this forward movement to the drum and bring the beveled ring H of the latter in contact with the friction-pulley R, as shown by Fig. 1. When the ring H of the drum is in frictional contact with the disk R said drum is winding, and when it is desired to have the same unwind the lever O is moved in a reverse direction to that already described, thereby permitting the entire drum to move back on its shaft E.

To compensate for the wear that comes upon the sliding pin L, loose collar J, and hub $c$ of the drum-ring G, I loosen the cap-plate $b'$ on the rear bearing $b$ of the shaft E and give a turn to the sleeve M, thereby drawing in upon the screw N, that is arranged in said sleeve, the outer flange $s$ of the latter being provided with a series of radial sockets $t$, in which to insert a suitable turning-tool. The drawing in of the screw N will force the pin L forward and thereby move the key K in the same direction to bring the collar J snug against the hub $c$ of the drum-ring G.

By the operation just described I avoid any lost motion, and when the drum is moved forward its beveled ring will always come snug against the friction-disk without any increased throw of the lever O.

When it is desirable to set the brake, a movement of the lever W in one direction will partially rotate the shaft V, thereby depressing the arms U' of the sleeve U to tighten the strap T and bring the blocks $p$ in frictional contact with the periphery of the drum-ring G. To release the brake the lever W is moved in the opposite direction to that already described, and the arms U' are thus returned to their normal position to loosen the straps T, the nuts on bolt $o$ being tightened whenever it is necessary to take up the wear on the blocks $p$, secured to said strap.

When the innermost non-beveled paper rings of the friction-disk become worn down to a bevel, I remove the annulus S, slip off all the rings from the flange $j$ of the wheel F, then take away a certain number of the outermost rings and fill up the space thus formed by placing an equal number of new rings against the innermost old ones, said new rings being plain upon their outer peripheries.

If found desirable, I may make the paper rings in segments, and may also, if preferred, arrange the segments composing one ring so that they will break joints with the segments composing the next adjacent rings.

Having now fully described my invention, what I claim as new, and desire to secure by Letters Patent, is—

1. In a hoisting-machine, the combination of the hollow-ended shaft E, provided with a longitudinal slot, the drum I, arranged to slide on the shaft, the key K, arranged in the shaft-slot, the loose collar J, also arranged on the shaft between a hub of the drum and the key, the pin L, arranged in the hollow end of the shaft to normally impinge against the key, the adjustable sleeve M, arranged to partly inclose the pin, the screw N, having its bearing in the sleeve, and the lever O, for actuating said screw, substantially as and for the purpose set forth.

2. In a hoisting-machine, a winding-drum, in combination with a sleeve keyed to a shaft and provided at each end with an arm U', the pin $U^2$, uniting the sleeve-arms, a flexible brake surrounding the drum and having its ends respectively secured to said sleeve and pin, and a lever for actuating the sleeve-shaft, substantially as set forth.

3. A hoisting-machine comprising the main shaft B, provided with a pinion, the slotted shaft E, a winding-drum on the latter shaft having one end thereof beveled upon its inner periphery, the wheel F, mounted on the drum-shaft and provided with gear-teeth that mesh with said pinion, a friction-disk having a beveled periphery and composed of a series of paper layers secured to said wheel, the loose collar J, key K, pin L, sleeve M, screw N, and lever O, the shaft V, sleeve U, cast in one piece with the arms U', the pin $U^2$, uniting said arms, the flexible brake T, having its ends respectively secured to said sleeve and pin $U^2$, and the lever W, all arranged to operate substantially as set forth.

In testimony that I claim the foregoing I have hereunto set my hand, at Milwaukee, in the county of Milwaukee and State of Wisconsin, in the presence of two witnesses.

HENRY B. TEFFT.

Witnesses:
H. G. UNDERWOOD,
N. E. OLIPHANT.